(12) United States Patent
Chen et al.

(10) Patent No.: US 9,298,045 B2
(45) Date of Patent: Mar. 29, 2016

(54) LIQUID CRYSTAL PANEL AND CROSS-SHAPED SPACER STRUCTURE THEREOF

(75) Inventors: Ya-hui Chen, Shenzhen (CN); Tsunglung Chang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 939 days.

(21) Appl. No.: 13/264,145

(22) PCT Filed: Aug. 4, 2011

(86) PCT No.: PCT/CN2011/078000
§ 371 (c)(1),
(2), (4) Date: Oct. 12, 2011

(87) PCT Pub. No.: WO2013/004034
PCT Pub. Date: Jan. 10, 2013

(65) Prior Publication Data
US 2013/0010238 A1    Jan. 10, 2013

(30) Foreign Application Priority Data
Jul. 5, 2011    (CN) .......................... 2011 1 0186917

(51) Int. Cl.
*G02F 1/1335* (2006.01)
*G02F 1/1339* (2006.01)

(52) U.S. Cl.
CPC .. *G02F 1/13394* (2013.01); *G02F 2001/13396* (2013.01); *G02F 2001/13398* (2013.01); *G02F 2201/18* (2013.01); *G02F 2201/503* (2013.01)

(58) Field of Classification Search
CPC .......... G02F 1/13394; G02F 1/133707; G02F 1/13392; G02F 2001/13396; G02F 1/134309
USPC .......................................... 349/106, 155–157
See application file for complete search history.

(56) References Cited

U.S. PATENT DOCUMENTS

| 5,499,128 | A  | * | 3/1996  | Hasegawa et al. | 349/155 |
| 5,838,414 | A  | * | 11/1998 | Lee             | 349/157 |
| 6,208,402 | B1 | * | 3/2001  | Tajima          | 349/156 |
| 6,373,547 | B2 | * | 4/2002  | Saito et al.    | 349/155 |

(Continued)

FOREIGN PATENT DOCUMENTS

| CN | 1661425 | 8/2005 |
| CN | 1982966 | 6/2007 |

(Continued)

*Primary Examiner* — Huyen Ngo
(74) *Attorney, Agent, or Firm* — Sughrue Mion, PLLC

(57) ABSTRACT

A liquid crystal panel and a cross-shaped spacer structure. The liquid crystal panel includes an array substrate, a color filter substrate, and a cross-shaped spacer structures sandwiched between the array substrate and the color filter substrate. The cross-shaped spacer structures includes strip-like first spacers disposed on the upper surface of the array substrate, and strip-like second spacers disposed on the lower surface of the color filter substrate. The end surfaces of each three of the strip-like first spacers and the end surface of each one of the strip-like second spacers are abutted against each other in a cross manner. Thus, when the liquid crystal panel is impacted by external force, the strip-like first spacers and the strip-like second spacers can keep a tight abutment therebetween, so as to ensure the display quality of the liquid crystal panel.

2 Claims, 5 Drawing Sheets

(56) References Cited

U.S. PATENT DOCUMENTS

| | | | |
|---|---|---|---|
| 6,433,852 B1* | 8/2002 | Sonoda et al. | 349/156 |
| 6,864,946 B2* | 3/2005 | Kim | 349/156 |
| 7,009,344 B2* | 3/2006 | Lee et al. | 315/169.3 |
| 7,525,631 B2 | 4/2009 | Lee et al. | |
| 7,684,003 B2 | 3/2010 | Paik et al. | |
| 8,749,746 B2* | 6/2014 | Koito et al. | 349/156 |
| 8,755,018 B2* | 6/2014 | Huang et al. | 349/155 |
| 2004/0135959 A1* | 7/2004 | Choi | 349/155 |
| 2008/0030938 A1* | 2/2008 | Kim et al. | 361/681 |
| 2009/0190084 A1 | 7/2009 | Sun | |
| 2009/0316105 A1 | 12/2009 | Oh et al. | |
| 2015/0002794 A1* | 1/2015 | Liu et al. | 349/106 |

FOREIGN PATENT DOCUMENTS

| | | |
|---|---|---|
| CN | 1982967 | 6/2007 |
| CN | 101201511 | 6/2008 |
| CN | 101373298 | 2/2009 |
| CN | 201812117 | 4/2011 |
| JP | 2010014985 | 1/2010 |

* cited by examiner

LIQUID CRYSTAL PANEL AND CROSS-SHAPED SPACER STRUCTURE THEREOF

FIELD OF THE INVENTION

The present invention relates to a display panel, and more particularly to a liquid crystal panel and a spacer structure thereof.

BACKGROUND OF THE INVENTION

A liquid crystal display (LCD) is a type of flat panel display (FPD) which displays images by the property of the liquid crystal material. In comparison with other display devices, the LCD has the advantages in lightweight, compactness, low driving voltage and low power consumption, and thus has already become the mainstream product in the whole consumer market. In a traditional process of LCD panel, it comprises a front-end array process, a mid-end cell process and a back-end modulation process. The front-end array process is used to produce thin-film transistor (TFT) substrates (also called array substrates) and color filter (CF) substrates; the mid-end cell process is used to combine the TFT substrate with the CF substrate, then fill liquid crystal into a space therebetween, and cut to form panels with a suitable product size; and the back-end modulation process is used to execute an installation process of the combined panel, a backlight module, a panel driver circuit, an outer frame, etc. Furthermore, in the mid-end cell process, the TFT substrate must be aligned and combined with the CF substrate for filling the liquid crystal into the space between the TFT substrate and the CF substrate.

Referring now to FIG. 1, a cross-sectional view of a traditional liquid crystal panel is illustrated in FIG. 1. It should be noted that the figure has omitted some components unrelated to the present description based on explanation convenience, so that the figure is only a simplified schematic view. As shown in FIG. 1, a traditional liquid crystal panel 90 is constructed by stacking a CF substrate 92 on an array substrate 91, wherein a plurality of spherical spacers 93 are dispersedly distributed between the array substrate 91 and the CF substrate 92. The spherical spacers 93 can maintain a fixed distance between the array substrate 91 and the CF substrate 92 for receiving the liquid crystal (not-shown).

Referring now to FIG. 2, a cross-sectional view of another traditional liquid crystal panel is illustrated in FIG. 2 which is also shown by a simplified schematic manner. The liquid crystal panel 90' of FIG. 2 is substantially the same as the liquid crystal panel 90 of FIG. 1, i.e. constructed by stacking a CF substrate 92' on an array substrate 91', wherein a plurality of pillar-like spacers 93' are protruded from a lower surface of the CF substrate 92', and the pillar-like spacers 93' are formed by exposure and development during manufacturing the CF substrate 92'. The pillar-like spacers 93' can maintain a fixed distance between the array substrate 91' and the CF substrate 92' for receiving the liquid crystal (not-shown).

Although the configurations of the traditional spacers 93, 93' are different, the common purpose thereof is to evenly support the gap between the array substrate 91, 91' and the CF substrate 92, 92' of the liquid crystal panel 90, 90', in order to ensure the display quality of the liquid crystal panel 90, 90'. However, there are still some problems existing in the traditional spacers 93, 93', as follows: for the spherical spacers 93 of FIG. 1, during the manufacturing process of dispersing the spherical spacers 93, it is difficult to efficiently control the distribution density of spraying process, so that the distribution density of the spherical spacers 93 is uneven to affect the evenness of the liquid crystal panel 90 and the display quality thereof. On the other hand, for the pillar-like spacers 93' of FIG. 2, when the liquid crystal panel 90' is impacted by external force, the pillar-like spacers 93 of the CF substrate 92' will be shifted in relation to the array substrate 91', and the displacement thereof can not be restored, resulting in permanently leaking light and thus affecting the display quality of the liquid crystal panel 90'.

As a result, it is necessary to provide a liquid crystal panel and a spacer structure thereof to solve the problems existing in the conventional technologies, as described above.

SUMMARY OF THE INVENTION

A primary object of the present invention is to provide a liquid crystal panel and a spacer structure thereof, which is used to solve the problems existing in the conventional technologies that the displacement of spacers affects the display quality of a liquid crystal panel.

To achieve the above object, the present invention provides a liquid crystal panel which comprises:

an array substrate having an upper surface provided with a plurality of first spacers; and a color filter (CF) substrate disposed on the array substrate, wherein a lower surface of the CF substrate is provided with a plurality of second spacers, and each of the second spacers is correspondingly abutted against one of the first spacers.

To achieve the above object, the present invention further provides a spacer structure of a liquid crystal panel, which is sandwiched between an array substrate and a color filter (CF) substrate for correspondingly constructing a liquid crystal panel, wherein each of the spacer structure comprises:

a first spacer disposed on an upper surface of the array substrate; and a second spacer disposed on a lower surface of the CF substrate, wherein the second spacer is correspondingly abutted against the first spacer.

In one embodiment of the present invention, the area of an end surface of the first spacer is not equal to the area of an end surface of the second spacer, and the end surface of the second spacer is abutted against the end surface of the first spacer.

In one embodiment of the present invention, the end surface of the first spacer is grid-like or strip-like, while the end surface of the second spacer is corresponding strip-like or grid-like, wherein the end surface of the first spacer and the end surface of the second spacer are arranged to each other in a cross manner.

In one embodiment of the present invention, the end surface of the first spacer and the end surface of the second spacer are strip-like, wherein the end surface of the first spacer and the end surface of the second spacer are arranged to each other in a cross manner.

In one embodiment of the present invention, the end surface of the first spacer is H-shape, and the end surface of the second spacer is strip-like, wherein the end surface of the second spacer is disposed on the end surface of the first spacer.

For the liquid crystal panel and the spacer according to the present invention, the first spacer and the second spacer commonly construct a spacer structure/assembly, so that the contact range between the end surface of the first spacer and the end surface of the second spacer can be increased. When the liquid crystal panel is impacted by external force, the first spacer and the second spacer of the spacer structure can keep a tight abutment therebetween all the time, so as to ensure the display quality of the liquid crystal panel.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
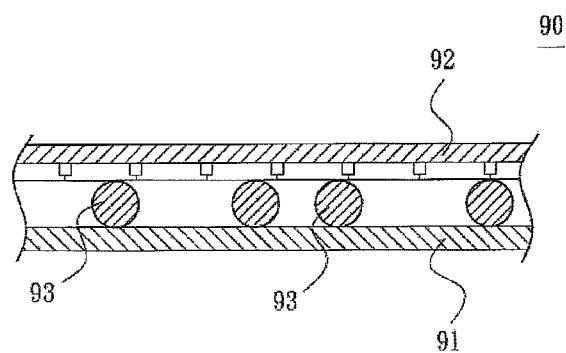
FIG. 1 is a cross-sectional view of a traditional liquid crystal panel.
Figure 2:
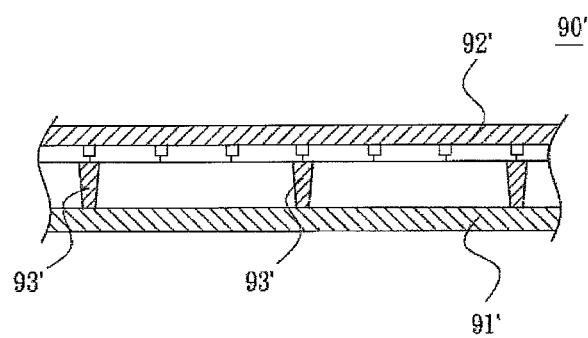
FIG. 2 is a cross-sectional view of another traditional liquid crystal panel.
Figure 3:
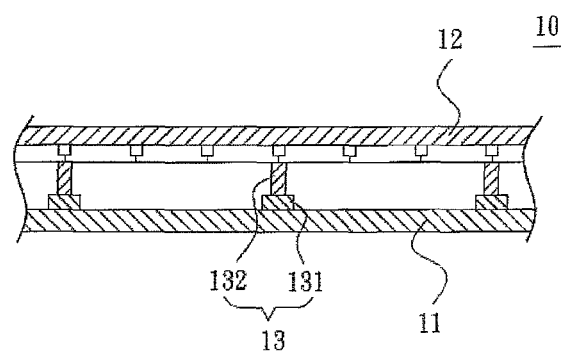
FIG. 3 is a cross-sectional view of a liquid crystal panel according to a first embodiment of the present invention.
Figure 4:
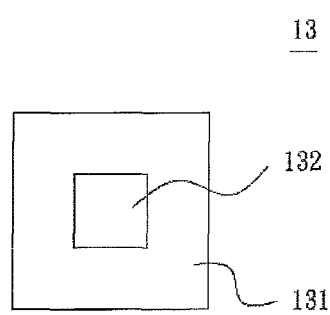
FIG. 4 is a top view of a spacer structure according to the first embodiment of the present invention.

Referring now to FIGS. 3 and 4, a cross-sectional view of a liquid crystal panel according to a first embodiment of the present invention is illustrated in FIG. 3, and a top view of a spacer structure according to the first embodiment of the present invention is illustrated in FIG. 4. It should be noted that the figures have omitted some components unrelated to the present description based on explanation convenience, so that the figures are only simplified schematic views. As shown in FIG. 3, a liquid crystal panel 10 according to the first embodiment of the present invention comprises an array substrate 11 and a color filter (CF) substrate 12, wherein the alignment assembly of the liquid crystal panel 10 means the array substrate 11 and the CF substrate 12 are aligned and combined with each other, and then a liquid crystal material (not-shown) is filled into a space between the array substrate 11 and the CF substrate 12, so as to construct the liquid crystal panel 10.

In the preferred embodiment of the present invention, an upper surface of the array substrate 11 is provided with a plurality of first spacers 131, while a lower surface of the CF substrate 12 is provided with a plurality of protruded second spacers 132, wherein the CF substrate 12 is disposed and stacked on the array substrate 11. Each of the second spacers 132 is correspondingly abutted against one of the first spacers 131, so as to construct a spacer structure 13, wherein the spacer structure 13 can maintain a fixed gap between the array substrate 11 and the CF substrate 12 when the CF substrate 12 is stacked on the array substrate 11.

Referring to FIG. 4, an end surface of the first spacer 131 and an end surface of the second spacer 132 are square, while the area of the end surface of the first spacer 131 is greater than that of the end surface of the second spacer 132. Moreover, the end surface of the second spacer 132 is abutted on the end surface of the first spacer 131. Thus, when the liquid crystal panel 10 is impacted by external force, the relative displacement between the first spacer 131 and the second spacer 132 may be changed. Because the area of the end surface of the first spacer 131 is greater than that of the end surface of the second spacer 132, the first spacer 131 still can keep being tightly abutting against the second spacer 132, so as to ensure the display quality of the liquid crystal panel 10.

In addition, according to present invention, the method of forming the first spacer 131 on the array substrate 11 and the second spacer 132 on the CF substrate 12 is not limited. The first spacer 131 can be a remaining portion of an etched insulation film and/or metal film during the manufacture process of the array substrate 11. The second spacer 132 can be formed by firstly coating material of the second spacer 132 and then carrying out some processes including pre-curing, exposure, development and post-curing after forming a transparent conductive film during the manufacture process of the CF substrate 92.

Furthermore, the first spacer 131 and the second spacer 132 are preferably pillar-like. Besides, in the embodiment, the end surface of the first spacer 131 and the end surface of the second spacer 132 are square, but the shape of the end surface of the first spacer 131 and the end surface of the second spacer 132 according to the present invention is not limited thereto, wherein the shape can be other configuration, such as various corresponding combination of rectangular, circular, oval, polygonal or other special shapes. In such a way, the purpose of the shape design is to keep tight abutment between the first spacer 131 and the second spacer 132.

Figure 5:
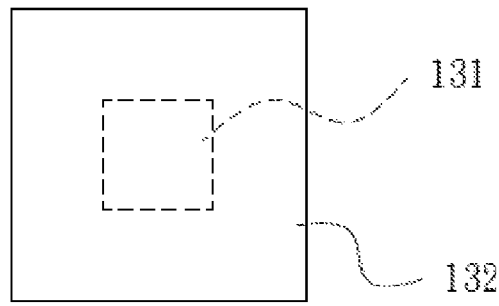
FIG. 5 is a top view of a spacer structure according to a second embodiment of the present invention.

Referring now to FIG. 5, a top view of a spacer structure of a liquid crystal panel according to a second embodiment of the present invention is illustrated in FIG. 5. The spacer structure 13 of the second embodiment of the present invention is substantially similar to the spacer structure 13 of the first embodiment, so that the second embodiment uses similar terms or numerals of the first embodiment. As shown, the difference between the first embodiment and the second embodiment is that the area of the end surface of the second spacer 132 is greater than that of the end surface of the first spacer 131, and the end surface of the first spacer 131 is abutted on the end surface of the second spacer 132. Thus, the spacer structure 13 still can keep the tight abutment between the first spacer 131 and the second spacer 132, so as to ensure the display quality of the liquid crystal panel 10.

Figure 6:
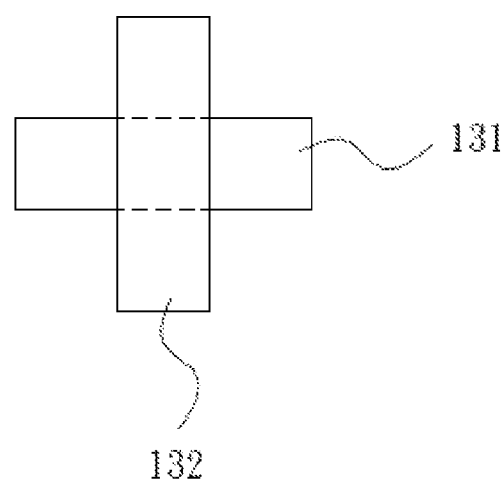
FIG. 6 is a top view of a spacer structure according to a third embodiment of the present invention.

Referring now to FIG. 6, a top view of a spacer structure of a liquid crystal panel according to a third embodiment of the present invention is illustrated in FIG. 6. The spacer structure 13 of the third embodiment of the present invention is substantially similar to the spacer structure 13 of the first embodiment, so that the third embodiment uses similar terms or numerals of the first embodiment. As shown, the difference between the first embodiment and the third embodiment is that the end surface of the first spacer 131 and the end surface of the second spacer 132 are strip-like, while the end surface of the first spacer 131 and the end surface of the second spacer 132 are arranged to each other in a cross manner. Thus, when the liquid crystal panel 10 is impacted by external force, the tight abutment between the first spacer 131 and the second spacer 132 of the spacer structure 13 can be still maintained, so as to ensure the display quality of the liquid crystal panel 10.

Figure 7:
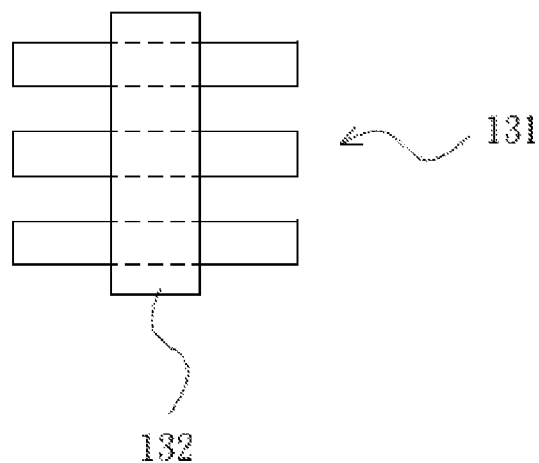
FIG. 7 is a top view of a spacer structure according to a fourth embodiment of the present invention.

Referring now to FIG. 7, a top view of a spacer structure of a liquid crystal panel according to a fourth embodiment of the present invention is illustrated in FIG. 7. The spacer structure 13c of the fourth embodiment of the present invention is substantially similar to the spacer structure 13b of the third embodiment, so that the fourth embodiment uses similar terms or numerals of the third embodiment. As shown, the difference between the third embodiment and the fourth embodiment is that the end surface of the first spacer 131 and the end surface of the second spacer 132 are strip-like, but the first spacer 131 includes three strip-like spacers, and the second spacer 132 is one strip-like spacer. Meanwhile, the end surface of the first spacer 131 and the end surface of the second spacer 132 are arranged to each other in a cross manner, so as to increase the number of contact points between the first spacer 131 and the second spacer 132. Thus, when the liquid crystal panel 10 is impacted by external force, the tight abutment between the first spacer 131 and the second spacer 132 of the spacer structure 13c can be still maintained, so as to ensure the display quality of the liquid crystal panel 10.

Figure 8:
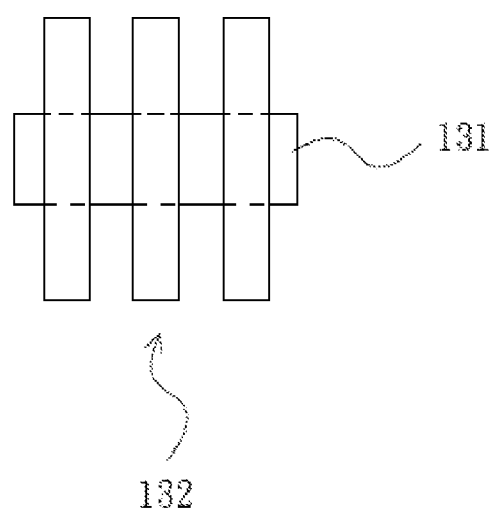
FIG. 8 is a top view of a spacer structure according to a fifth embodiment of the present invention.

Referring now to FIG. 8, a top view of a spacer structure of a liquid crystal panel according to a fifth embodiment of the present invention is illustrated in FIG. 8. The spacer structure 13 of the fifth embodiment of the present invention is substantially similar to the spacer structure 13 of the third embodiment, so that the fifth embodiment uses similar terms or numerals of the third embodiment. As shown, the difference between the third embodiment and the fifth embodiment is that the end surface of the second spacer 132 is grid-like, and the end surface of the first spacer 131 is strip-like. Meanwhile, the end surface of the first spacer 131 and the end surface of the second spacer 132 are arranged to each other in a cross manner, so as to increase the number of contact points between the first spacer 131 and the second spacer 132. Thus, when the liquid crystal panel 10 is impacted by external force, the tight abutment between the first spacer 131 and the second spacer 132 of the spacer structure 13 can be still maintained, so as to ensure the display quality of the liquid crystal panel 10.

Figure 9:
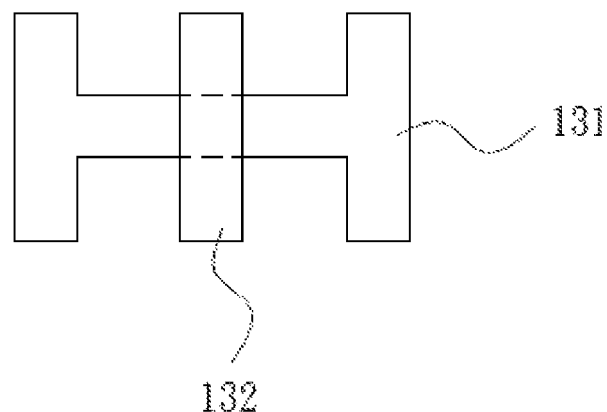
FIG. 9 is a top view of a spacer structure according to a sixth embodiment of the present invention.

Referring now to FIG. 9, a top view of a spacer structure of a liquid crystal panel according to a sixth embodiment of the present invention is illustrated in FIG. 9. The spacer structure 13 of the sixth embodiment of the present invention is substantially similar to the spacer structure 13 of the third embodiment, so that the sixth embodiment uses similar terms or numerals of the third embodiment. As shown, the difference between the third embodiment and the sixth embodiment is that the end surface of the first spacer 131 is H-shape, and the end surface of the second spacer 132 is strip-like. Meanwhile, the end surface of the second spacer 132 is disposed on the end surface of the first spacer 131, so as to increase the number of contact points between the first spacer 131 and the second spacer 132. Thus, the spacer structure 13 still can maintain the tight abutment between the first spacer 131 and the second spacer 132, so as to ensure the display quality of the liquid crystal panel 10.

As described above, in comparison with the traditional pillar-like spacer of the liquid crystal panel which the spacers may be shifted due to external force to thus cause permanently light leakage and affect the display quality of the liquid crystal panel, the liquid crystal panel 10 of the present invention is provided with a plurality of spacer structures 13 sandwiched between the array substrate 11 and the CF substrate 12, wherein each of the spacer structures 13 comprises: a first spacer 131 disposed on an upper surface of the array substrate 11; and a second spacer 132 disposed on a lower surface of the CF substrate 12, while the second spacer 132 is correspondingly abutted against the first spacer 131. Thus, the contact range between the first spacer 131 and the second spacer 132 can be increased. When the liquid crystal panel 10 is impacted by external force, the first spacer 131 and the second spacer 132 of the spacer structure 13 can keep a tight abutment therebetween all the time, so as to ensure the display quality of the liquid crystal panel 10.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal panel, characterized in that: the liquid crystal panel comprises:
    an array substrate having an upper surface provided with a plurality of strip-like first spacers; and
    a color filter substrate disposed on the array substrate, wherein a lower surface of the color filter substrate is provided with a plurality of strip-like second spacers, and end surfaces of each three of the strip-like first spacers and an end surface of each one of the strip-like second spacers are abutted against each other in a cross manner.

2. A spacer structure of a liquid crystal panel, sandwiched between an array substrate and a color filter substrate for correspondingly constructing a liquid crystal panel, the spacer structure of the liquid crystal panel being characterized in that: the spacer structure comprises:
    a plurality of strip-like first spacers disposed on an upper surface of the array substrate; and
    a plurality of strip-like second spacers disposed on a lower surface of the color filter substrate, wherein end surfaces of each three of the strip-like first spacers and an end surface of each one of the strip-like second spacers are abutted against each other in a cross manner.

* * * * *